United States Patent
Powers et al.

(10) Patent No.: US 6,317,963 B1
(45) Date of Patent: Nov. 20, 2001

(54) ONE PIECE, EXTRUDED HOUSING FOR A DYNAMOELECTRIC MACHINE

(75) Inventors: Theodore Clifton Powers, Winnebago; Kris Harold Campbell, Poplar Grove, both of IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/368,271

(22) Filed: Aug. 3, 1999

(51) Int. Cl.$^7$ ................................................. H02K 15/00
(52) U.S. Cl. ............................ 29/596; 29/598; 310/52; 310/58; 310/61; 310/261
(58) Field of Search ................... 29/596, 598; 310/52, 310/58, 61, 261

(56) References Cited

U.S. PATENT DOCUMENTS

| | | | |
|---|---|---|---|
| 3,844,031 | * 10/1974 | Stone | 29/596 |
| 3,874,073 | * 4/1975 | Dochterman | 29/598 |
| 3,932,930 | * 1/1976 | Dochterman | 29/596 |
| 3,990,141 | * 11/1976 | Stark | 29/596 |
| 5,796,190 | * 8/1998 | Takeda | 310/58 |
| 5,918,360 | * 7/1999 | Forbes | 29/596 |
| 6,161,274 | * 12/2000 | Stark | 29/596 |
| 6,181,048 | * 1/2001 | Smith | 310/261 |

* cited by examiner

Primary Examiner—Lee Young
Assistant Examiner—Paul Kim
(74) Attorney, Agent, or Firm—Jeffery N. Fairchild; Wood Phillips Van Santen Clark

(57) ABSTRACT

A dynamoelectric machine (10) includes a stator (12), a rotor (14), a bearing (16) supporting the rotor (14) for rotation about an axis (20), and a housing (22). The housing (22) is manufactured by first forming a unitary metallic extrusion (24) including a radially innermost nominally cylindrical member (26), a radially outermost nominally cylindrical member (28), a central nominally cylindrical member (30) spaced radially between the innermost and outermost members (26, 28), a set of spokes (32) connecting the innermost and central cylindrical members (26, 30) together, a set of arcuate cooling passages (34), a set of spokes (36) connecting the central outermost cylindrical members (30, 28) together, and a set of arcuate cooling passages (38). A set of fins (40) are also formed during the extrusion process extending radially from the central cylindrical member (30) into the cooling passages (38). The spokes (32, 36), passages (34, 38), fins (40), and cylindrical members (26, 28, 30) extend parallel to the axis (20) from a first end (42) of the extrusion (24) to a second end (44) of the extrusion (24), with the cylindrical members (26, 28, 30) preferably being at least nominally concentric on the axis (20). After the extrusion (24) is formed, sufficient lengths of the innermost cylindrical member (26) and the spokes (32) are machined away to create a cavity (46) in the central cylindrical member (30) for receiving the stator (12) and rotor (14).

17 Claims, 4 Drawing Sheets

ONE PIECE, EXTRUDED HOUSING FOR A DYNAMOELECTRIC MACHINE

FIELD OF THE INVENTION

This invention relates to dynamoelectric machines, and in particular to the housings for such machines and methods for manufacturing such housings.

BACKGROUND

It is known for dynamoelectric machines to utilize a multi-piece housing assembly including a cylindrical enclosure surrounding the stator and the rotor of the dynamoelectric machine, with bearing mounts fastened to each end of the enclosure to support the bearings for the shaft of the rotor. It is also known for the bearing mounts to include one or more cooling passages to allow a cooling flow over the stator and rotor of the dynamoelectric machine. In at least one known multi-piece housing assembly, the cylindrical stator/rotor enclosure is an extrusion including heat exchange fins on the outer surface of the enclosure to improve the heat dissipation from the stator and rotor of the dynamoelectric machine. In addition to a bearing mount, this multi-piece housing assembly also includes a sheet metal cover surrounding the stator/rotor enclosure to create cooling passages that direct a cooling flow over the fins. The sheet metal cover is fastened to a set of spokes on the extrusion that extend radially outward between the fins.

While there are known housing constructions that work well for their intended purpose, there is always room for improvement. For example, there is an continuing desire to reduce the cost and complexity of manufacturing the housings for dynamoelectric machines.

SUMMARY OF THE INVENTION

In accordance with the invention, a method is provided for manufacturing a dynamoelectric machine including a stator, a rotor, at least one bearing for rotatably supporting the rotor, and a one piece housing for the stator, the rotor and the at least one bearing. The method includes the step of forming a unitary metallic extrusion including a radially innermost cylindrical member, a radially outermost cylindrical member, a central cylindrical member spaced radially between the innermost and outermost members, a first set of spokes connecting the innermost and central cylindrical members together, a first set of arcuate cooling passages defined between the first set of spokes and the innermost and central cylindrical members, a second set of spokes connecting the outermost and central cylindrical members together, and a second set of arcuate cooling passages defined between the second set of spokes and the outermost and central cylindrical members, with the spokes, passages, and cylindrical members extending from a first end of the extrusion to a second end of the extrusion. The method further includes the steps of machining away sufficient lengths of the innermost cylindrical member and the first set of spokes to create a cavity in the central cylindrical member for receiving the stator and the rotor of the dynamoelectric machine, forming a bearing seat in a remaining length of the innermost member, and assembling the at least one bearing, the stator, and the rotor into the bearing seat and the central cylindrical member, respectively.

According to one form of the invention, a dynamoelectric machine is manufactured according to the method described above.

In accordance with one form of the invention, a method is provided for manufacturing a housing for a dynamoelectric machine including a stator, a rotor, and at least one bearing for rotatably supporting the rotor. The method includes the step of forming a unitary metallic extrusion including a radially innermost cylindrical member, a radially outermost cylindrical member, a central cylindrical member spaced radially between the innermost and outermost members, a first set of spokes connecting the innermost and central cylindrical members together, a first set of arcuate cooling passages defined between the first set of spokes and the innermost and central cylindrical members, a second set of spokes connecting the outermost and central cylindrical members together, and a second set of arcuate cooling passages defined between the second set of spokes and the outermost and central cylindrical members. The spokes, passages, and cylindrical members extend from a first end of the extrusion to a second end of the extrusion. The method further includes the step of machining away sufficient lengths of the innermost cylindrical member and the first set of spokes to create a cavity in the central cylindrical member for receiving the stator and the rotor of the dynamoelectric machine.

In one form of the invention, the method further includes the step of forming a bearing seat and a remaining length of the innermost member.

In accordance with one form of the invention, the step of forming a unitary metallic extrusion further comprises forming a plurality of fins surfaces extending from the central member into the second set of arcuate cooling passages.

According to one form of the invention, the step of forming a unitary metallic extrusion further includes forming the first set of spokes to be spaced at equal angular intervals from each other, and forming the second set of spokes to be spaced at equal angular intervals from each other and at equal angular intervals from each of the first set of spokes.

In accordance with one form of the invention, a method is provided for manufacturing a housing for a dynamoelectric machine including a stator, a rotor, and at least one bearing for rotatably supporting the rotor. The method includes the step of forming a unitary metallic extrusion including three nominally concentric cylindrical members connected to each other by spokes, and machining away sufficient lengths of a radially innermost one of the cylindrical members and its associated spokes to create a cavity in a radially central one of the cylindrical members for receiving the stator and the rotor of the dynamoelectric machine, while retaining a sufficient length of the radially innermost one of cylindrical members to receive the at least one bearing. Prior to the machining step, the spokes and the cylindrical members extend from a first end of the extrusion to a second end of the extrusion and define a first set of arcuate cooling passages between the radially innermost one of the cylindrical members and the radially central one of the cylindrical members, and a second set of arcuate cooling passages between a radially outermost one of the cylindrical members and the radially central one of the cylindrical members.

In one form of the invention, a housing for a dynamoelectric machine is manufactured according to the methods described in the paragraphs of this section above.

Other objects and advantages will be apparent from the following specification taken in connection with the accompanying drawings.

DETAILED DESCRIPTION OF THE PREFERRED EMBODIMENT

Figure 2:
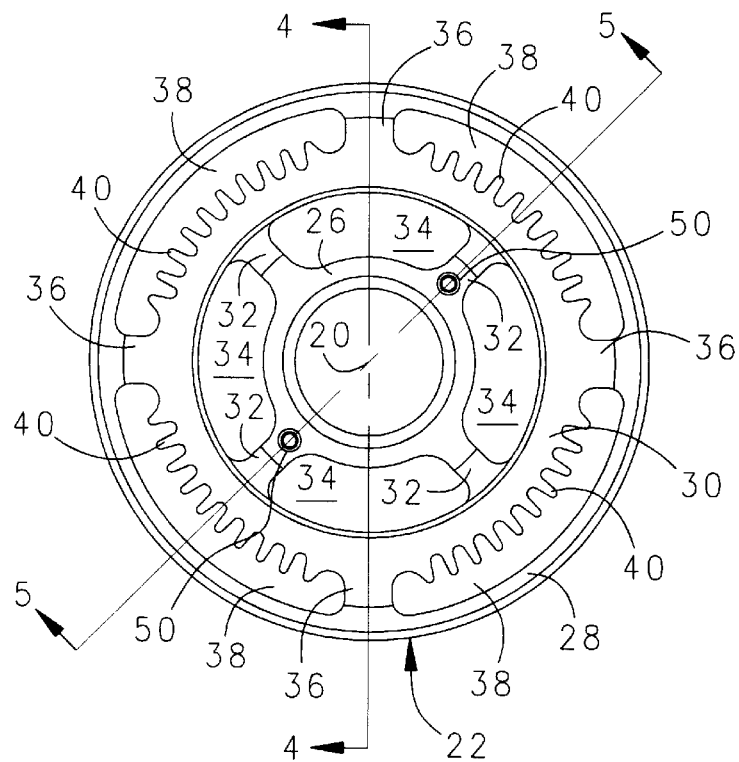
FIG. 2 is a left-hand end view of the housing shown in FIG. 1, with the remaining components of the dynamoelectric machine removed.
Figure 1:
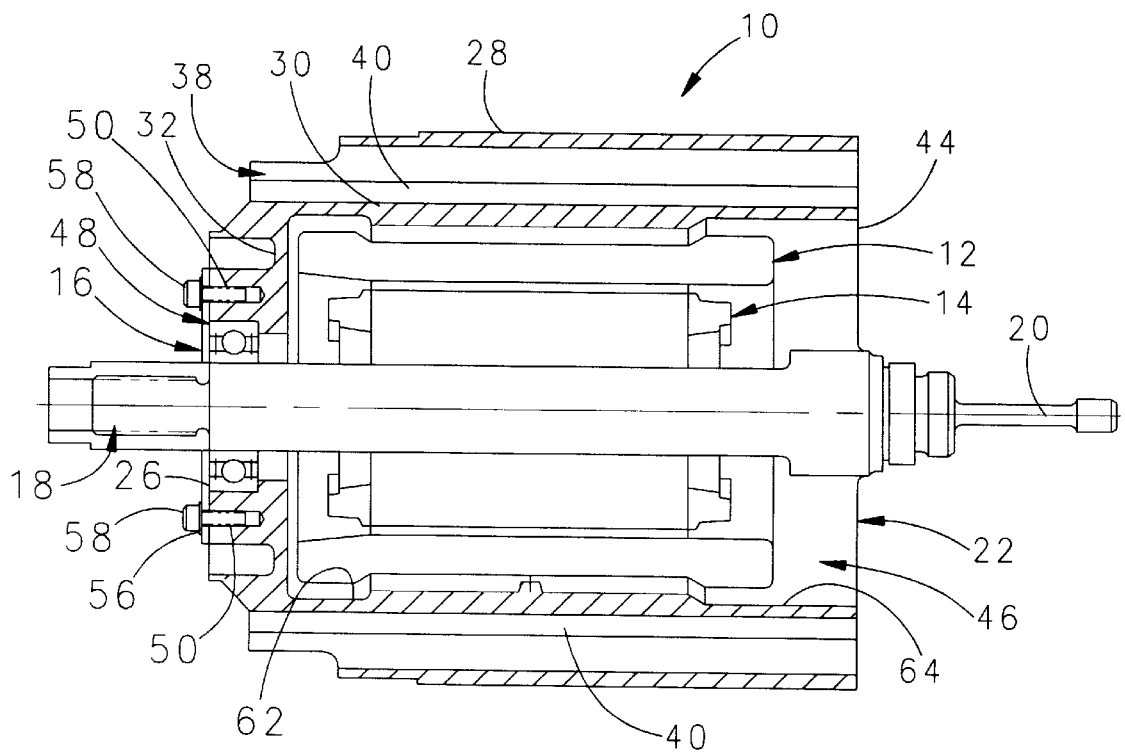
FIG. 1 is a longitudinal section view of a dynamoelectric machine including a housing manufactured according to the invention.
Figure 3:
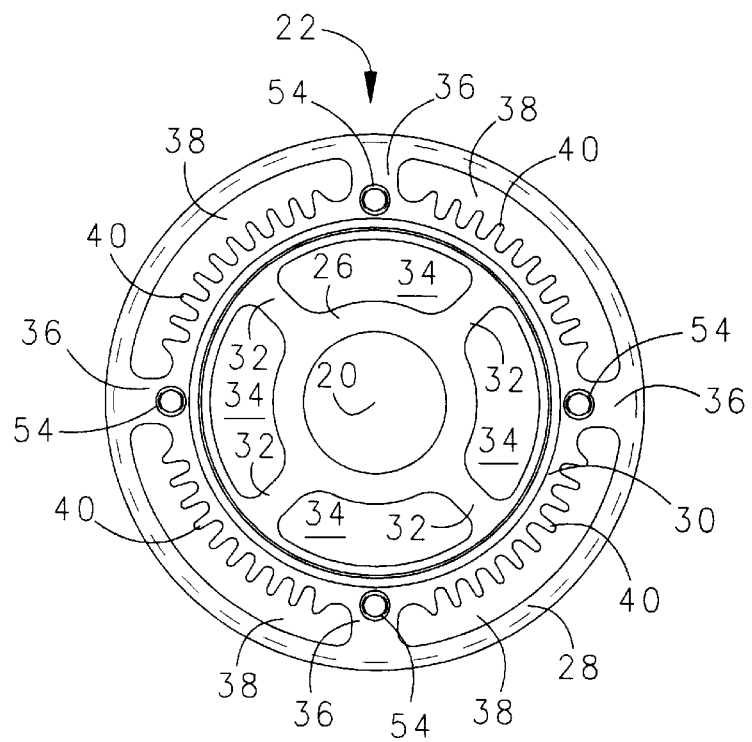
FIG. 3 is a right-hand end view of the housing shown in FIG. 1.

As shown in FIG. 1, a dynamoelectric machine 10 includes a stator 12, a rotor 14, a bearing 16 supporting a shaft 18 of the rotor 14 for rotation about an axis 20, and a housing 22 embodying the present invention. Because any suitable construction may be used for the stator 12, rotor 14, bearing 16, and shaft 18, as required by the particular form of the dynamoelectric machine 10, these components need not be described in further detail.

Figure 6:
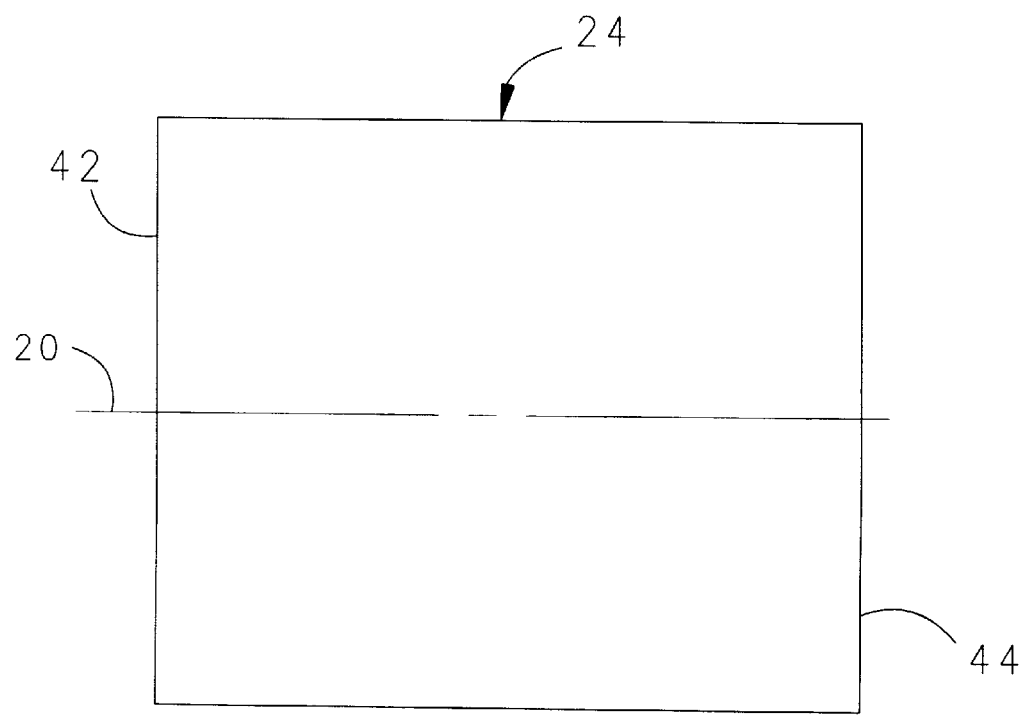
FIG. 6 is a side view of a one piece metallic extrusion used in the manufacture of the housing shown in FIG. 1.
Figure 7:
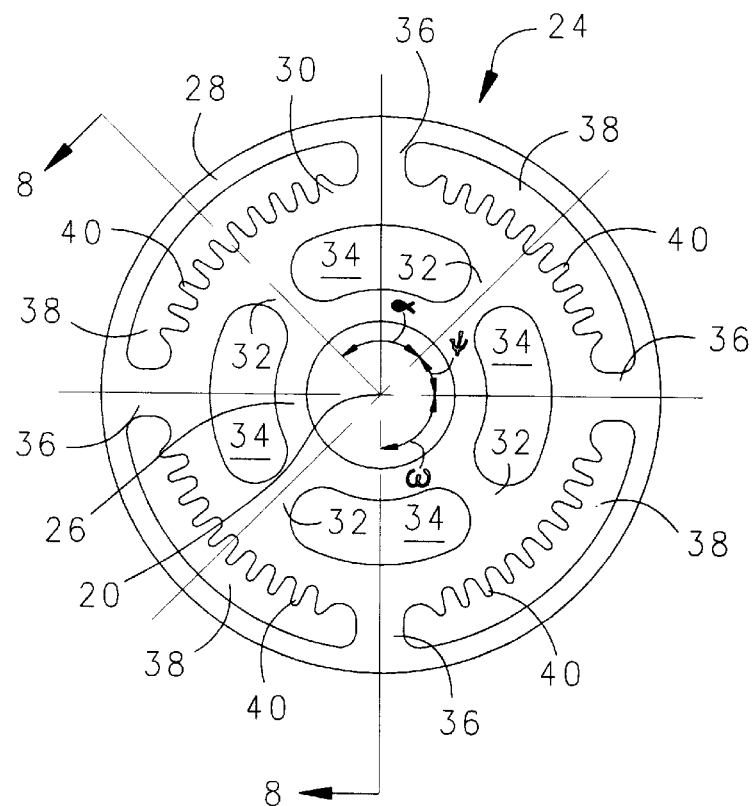
FIG. 7 is an end view of the extrusion shown in FIG. 6.
Figure 8:
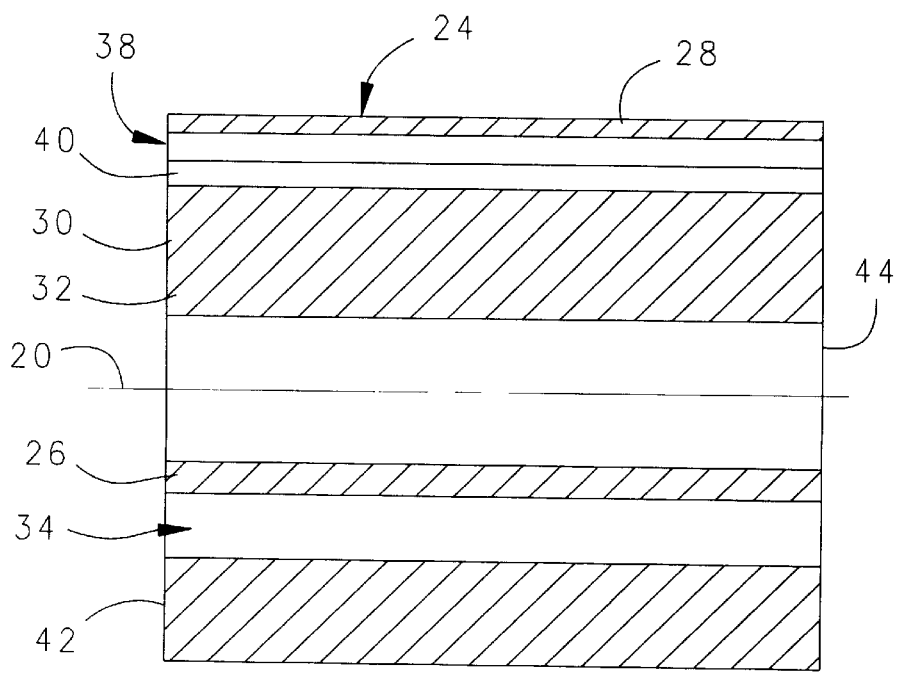
FIG. 8 is a section view taken generally along the line 8—8 in FIG. 7.

The housing 22 is manufactured by first forming a unitary metallic extrusion 24, as shown in FIGS. 6–8. The extrusion 24 can be formed using any suitable extrusion technique, and preferably utilizes multi-piece extrusion dyes and mandrels. As best seen in FIGS. 7 and 8, the extrusion 24 includes a radially innermost nominally cylindrical member 26, a radially outermost nominally cylindrical member 28, a central nominally cylindrical member 30 spaced radially between the innermost and outermost members 26 and 28, a set of spokes 32 connecting the innermost and central cylindrical members 26 and 30 together, a set of arcuate cooling passages 34, a set of spokes 36 connecting the central outermost cylindrical members 30 and 28 together, and a set of arcuate cooling passages 38. A set of fins 40 are also formed during the extrusion process extending radially from the central cylindrical member 30 into the cooling passages 38. The spokes 32 and 36, passages 34 and 38, fins 40, and cylindrical members 26, 28 and 30 extend parallel to the axis 20 from a first end 42 of the extrusion 24 to a second end 44 of the extrusion 24, with the cylindrical members 26, 28 and 30 preferably being at least nominally concentric on the axis 20

It should be understood that as used herein nominally cylindrical is intended to broadly cover all shapes that are functionally cylindrical including, for example, true cylinders, shapes with oval cross-sections, and shapes with polygon cross-sections having large numbers of sides, i.e. five of more.

While a number of arrangements of the spokes 36 and 44 are possible, it is preferred that the set of spokes 32 be spaced at equal angular intervals a from each other, and that the set of spokes 36 be spaced at equal angular intervals ω from each other and at equal angular intervals ψ from each of the spokes 32. This arrangement of the spokes 32 and 36 provides adequate support of the cylindrical members 26, 28 and 30 during the extrusion process. It should be appreciated that while in the preferred embodiment there are four of the spokes 32 and four of the spokes 36, the invention contemplates other numbers of spokes 32 and 36.

While any suitable material may be used for the extrusion 24, the extrusion 24 is preferably made from 6063 aluminum.

Figure 4:
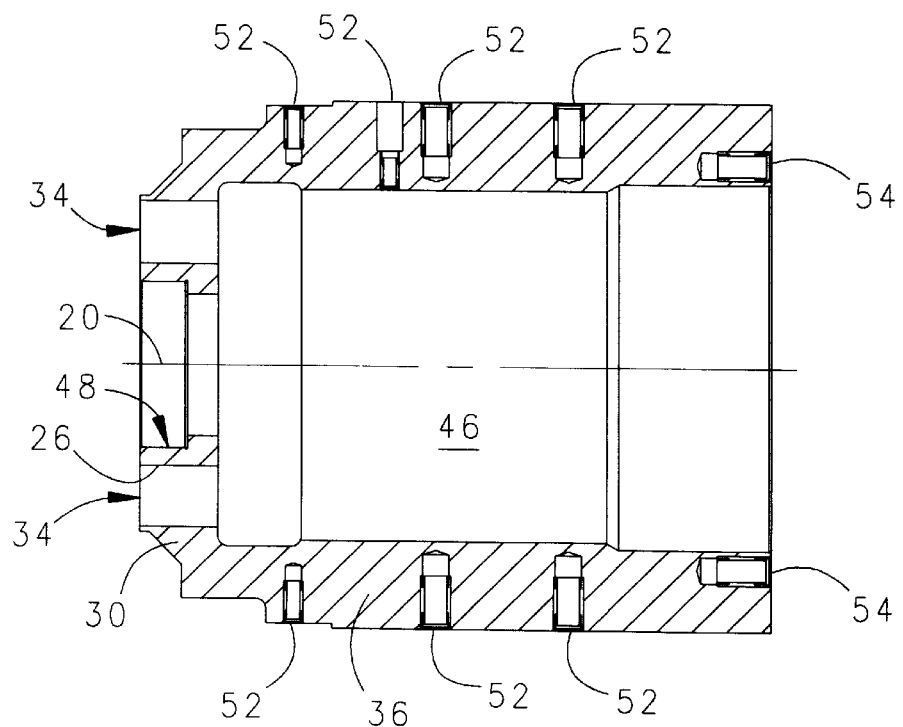
FIG. 4 is a section view taken generally along the line 4—4 in FIG. 2.
Figure 5:
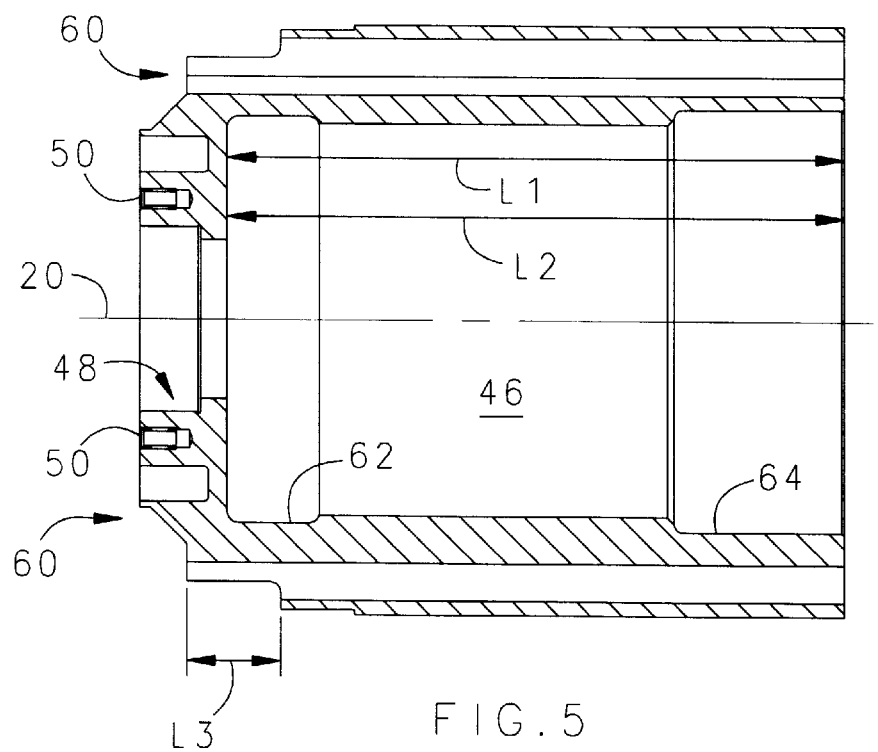
FIG. 5 is a section view taken generally along the line 5—5 in FIG. 2.

As best seen in FIGS. 4 and 5, after the extrusion 24 is formed, sufficient lengths L1 and L2, respectively, of the innermost cylindrical member 26 and the spokes 32 are machined away to create a cavity 46 in the central cylindrical member 30 for receiving the stator 12 and rotor 14. In the illustrated embodiment, L1 equals L2. A bearing seat 48 is also machined into a portion of the innermost cylindrical member 26 to receive the bearing 16.

Optionally, threaded bores, such as those shown at 50, 52 and 54, may be machined into the spokes 32 and 36 and the cylindrical members 26, 28 and 30. The threaded bores 50, 52 and 54 allow for the attachment of various brackets, caps, and mounting structures to the housing 22 and may be placed as dictated by the needs of the particular dynamoelectric machine. For example, as best seen in FIG. 1, the threaded bores 50 allow for the attachment of a bearing retainer 56 by threaded fasteners 58.

As another option, a length L3 of the outermost cylindrical member 28 may be machined away to radially expose a portion of the central cylindrical member 30 and its fins 40, as best seen in FIG. 5.

As yet another option, one or both of the ends 42 and 44 may be contoured to provide whatever shape may be required for the dynamoelectric machine 10. An example of such contouring is shown at 60 in FIG. 5. Additionally, the interior surface of the central cylindrical member 30 may be relieved as shown at 62 and 64 to provide additional air gap clearance from the stator 12.

The above operations on the extrusion 24 may be performed using any suitable machining process. Additionally, a suitable surface treatment, such as chem film or anodize, may be applied to the extrusion 24 either before or after machining.

After the extrusion 24 has been machined to form the housing 22, the bearing 16 and the stator 12 and rotor 14 are assembled into the bearing seat 48 and cavity 46, respectively, to create the dynamoelectric machine 10. While not shown, a second bearing supported by another housing are assembled to the dynamoelectric machine at a higher level of assembly to support the rotor shaft 18 adjacent the end 44 of housing 22.

It should be understood that the cooling passages 34 allow a cooling flow to pass over the stator 12 and the rotor 14 and through the cavity 46. It should also be understood that the cooling passages 38 direct a cooling flow over the fins 40 which increase the heat rejection capabilities of the housing 22. However, while it is preferred to include the fins 40 as part of the central cylindrical member 30, the invention contemplates extrusions 24 and housings 22 that do not include such fins.

It should appreciated that by utilizing the one piece extrusion 24 and then machining away the portions of the extrusion 24 that are not required for the final form of the housing 22, a number of components and machining operations have been eliminated in comparison to prior multi-piece housings, thereby reducing the cost associated with manufacturing the dynamoelectric machine 10.

What is claimed is:

1. A method of manufacturing a dynamoelectric machine including a stator, a rotor, at least one bearing for rotatably supporting the rotor, and a housing for receiving the stator, the rotor and the at least one bearing, the method comprising the steps of:

forming a unitary metallic extrusion including a radially innermost nominally cylindrical member, a radially outermost nominally cylindrical member, a central nominally cylindrical member spaced radially between the innermost and outermost members, a first set of spokes connecting the innermost and central cylindrical members together, a first set of arcuate cooling passages defined between the first set of spokes and the innermost and central cylindrical members, a second set of spokes connecting the outermost and central cylindrical members together, and a second set of arcuate cooling passages defined between the second set of spokes and the outermost and central cylindrical members, the spokes, passages, and cylindrical members extending from a first end of the extrusion to a second end of the extrusion;

machining away sufficient lengths of the innermost cylindrical member and the first set of spokes to create a cavity in the central cylindrical member for receiving the stator and the rotor of the dynamoelectric machine;

forming a bearing seat in a remaining length of the innermost member; and assembling the at least one bearing, and the stator and rotor into the bearing seat and the central cylindrical member, respectively.

2. The method of claim 1 wherein the step of forming a unitary metallic extrusion further comprises forming a plurality of fin surfaces extending from the central member into the second set of arcuate cooling passages.

3. The method of claim 1 wherein the step of forming a unitary metallic extrusion further comprises forming the first set of spokes to be spaced at equal angular intervals from each other and forming the second set of spokes to be spaced at equal angular intervals from each other and at equal angular intervals from each of the first set of spokes.

4. The method of claim 1 further comprising the step of forming a threaded bore extending from the outermost cylindrical member into one of the spokes of the second set of spokes.

5. The method of claim 1 further comprising the step of machining away a length of the outermost cylindrical member to radially expose a length of the central cylindrical member.

6. The method of claim 1 wherein the step of forming a unitary metallic extrusion filter comprises forming the innermost, outermost, and central members to be concentric with each other.

7. The method of claim 2 wherein the step of forming a unitary metallic extrusion further comprises forming the first set of spokes to be spaced at equal angular intervals from each other, and forming the second set of spokes to be spaced at equal angular intervals from each other and at equal angular intervals from each of the first set of spokes.

8. A method of manufacturing a housing for a dynamoelectric machine including a stator, a rotor, and at least one bearing for rotatably support the rotor, the method comprising the steps of:

forming a unitary metallic extrusion including three nominally concentric nominally cylindrical members connected to each other by spokes, the spokes and the cylindrical members extending from a first end of the extrusion to a second end of the extrusion and defining a first set of arcuate cooling passages between a radially innermost one of the cylindrical members and a radially central one of the cylindrical members, and a second set of arcuate cooling passages between a radially outermost one of the cylindrical members and the radially central one of the cylindrical members; and machining away sufficient lengths of the radially innermost one of the cylindrical members and its associated spokes to create a cavity in the radially central one of the cylindrical members for receiving the stator and the rotor of the dynamoelectric machine and retaining a sufficient length of the radially innermost one of the cylindrical members to receive the at least one bearing.

9. The method of claim 8 further comprising the step of forming a bearing seat in a remaining length of the radially innermost one of the cylindrical members.

10. The method of claim 8 wherein the step of forming a unitary metallic extrusion further comprises forming a plurality of fins extending from the radially central one of the cylindrical members into the second set of arcuate cooling passages.

11. The method of claim 8 wherein the step of forming a unitary metallic extrusion further comprises forming the spokes to be spaced at equal angular intervals from each other.

12. A method of manufacturing a housing for a dynamoelectric machine including a stator, a rotor, and at least one bearing for rotatably supporting the rotor, the method comprising the steps of:

forming a unitary metallic extrusion including a radially innermost nominally cylindrical member, a radially outermost nominally cylindrical member, a central nominally cylindrical member spaced radially between the innermost and outermost members, a first set of spokes connecting the innermost and central cylindrical members together, a first set of arcuate cooling passages defined between the first set of spokes and the innermost and central cylindrical members, a second set of spokes connecting the outermost and central cylindrical members together, and a second set of arcuate cooling passages defined between the second set of spokes and the outermost and central cylindrical members, the spokes, passages, and cylindrical members extending from a first end of the extrusion to a second end of the extrusion; and machining away sufficient lengths of the innermost cylindrical member and the first set of spokes to create a cavity in the central cylindrical member for receiving the stator and the rotor of the dynamoelectric machine.

13. The method of claim 12 further comprising the step of forming a bearing seat in a remaining length of the innermost member.

14. The method of claim 12 wherein the step of forming a unitary metallic extrusion further comprises forming a plurality of fin surfaces extending from the central member into the second set of arcuate cooling passages.

15. The method of claim 12 further comprising the step of forming a threaded bore extending from the outermost cylindrical member into one of the spokes of the second set of spokes.

16. The method of claim 12 further comprising the step of machining away a length of the outermost cylindrical member to radially expose a length of the central cylindrical member.

17. The method of claim 12 wherein the step of forming a unitary metallic extrusion further comprises forming the innermost, outermost, and central member to be concentric with each other.

* * * * *